United States Patent [19]
Van Der Tol

[11] Patent Number: 5,900,957
[45] Date of Patent: May 4, 1999

[54] OPTICAL PACKET-SWITCHED TRANSMISSION NETWORK

[75] Inventor: Johannes Jacobus Gerardus Maria Van Der Tol, Zoetermeer, Netherlands

[73] Assignee: Koninklijke PTT Nederland N.V., Netherlands

[21] Appl. No.: 08/808,310

[22] Filed: Feb. 28, 1997

[30] Foreign Application Priority Data

Mar. 6, 1996 [NL] Netherlands .............................. 1002544
Feb. 12, 1997 [NL] Netherlands .............................. 1005263

[51] Int. Cl.⁶ .................................................. H04J 14/08
[52] U.S. Cl. .......................... 359/139; 359/123; 359/122; 370/471; 370/352
[58] Field of Search .................................... 359/123, 135, 359/180, 139, 173, 122, 156; 370/352, 355–356, 471, 912

[56] References Cited

U.S. PATENT DOCUMENTS 4,894,818   1/1990   Fujioka et al. ........................... 359/123

FOREIGN PATENT DOCUMENTS 0 513 919   11/1992   European Pat. Off. .
0 522 625   1/1993    European Pat. Off. .
0 562 695   9/1993    European Pat. Off. .
0 738 907   10/1996   European Pat. Off. .
WO 93/17363 9/1993   WIPO .
WO 93/21706 10/1993  WIPO .

OTHER PUBLICATIONS

D.C. Butzer et al, "Highly efficient interconnection for use with a multistage optical switching network with orthogonally polarized data and address information", *Applied Optics*, vol. 34, No. 11, 10 Apr. 10, 1995, pp. 1788–1800.

D. Cotter, et al, "Self–routing of 100 Gbit/s packets using 6 bits 'keyword' recognition", *Electronics Letter*, vol. 31, No. 25, Dec. 7, 1995, pp. 2201–2202.

R. B. Jenkins, et al, "Acousto–optic comparison switch for optical switching networks with analog addressing techniques", *Applied Optics*, vol. 31, No. 26, Sep. 10, 1992, pp. 5453–5463.

F. Masetti et al, "ATMOS (ATM Optical Switching): Results and Conclusions of the RACE R2039 Project", *ECOC '95*, Conference Paper No. 243, Sep. 1995, Brussels, pp. 1–8.

F. Masetti et al, "Optical Cell Processor For ATM Gigabit Photonic Switches", *ECOC '92*, pp. 301–304.

E. Park, et al, "Simultaneous All–Optical Packet–Header Replacement and Wavelength Shifting for a Dynamically–Reconfigurable WDM Network", *IEEE Photonics Technology Letters*, vol. 7, No. 7, Jul. 1995, pp. 810–812.

P. T. Poggiolini et al, "Performance Evaluation of Subcarrier Encoding of Packet Headers in Quasi–All–Optical Broadband WDM Networks", *Proceedings of SUPERCOMM/ICC '94*, May 1–5, 1994, New Orleans, pp. 1681–1686.

I. Glesk, et al, "All–optical address recognition and Self–routing in a 250 Gbit/s packet–switched network", *Electronic Letters*, vol. 30, No. 16, Aug. 4, 1994, pp. 1322–1323.

J. Spring, et al, "Photonic Header Replacement For Packet Switching", *Electronic Letters*, vol. 29, No. 17, Aug. 19, 1993, pp. 1523–1525.

*Primary Examiner*—Kinfe-Michael Negash
*Attorney, Agent, or Firm*—Michaelson & Wallace; Peter L. Michaelson

[57] ABSTRACT

In an optical packet-switched network provided with one or more nodes (1), a transmitter (6, 17) transmits polarized packet signals (P) over optical connections (4, 5). A polarized packet signal comprises an address signal ($A_1$) and a data signal ($I_0$), which are generated by the transmitter with different, preferably mutually orthogonal, polarization states (;, •). In a node (1), the address signal ($A_1$) from a packet signal (or from a power portion (P1) thereof), is separated from the data signal ($I_0$), in a polarization beam splitter (9). From the separated address signals, a control unit (11) derives control signals by means of which an optical switch (7) is switched for further routing of the packet signals (or of the remaining power sections ($P_2$) thereof). In a second embodiment, polarized packet signals are switched through after they have been provided with an altered address signal in a polarization beam combiner.

20 Claims, 5 Drawing Sheets

OPTICAL PACKET-SWITCHED TRANSMISSION NETWORK

BACKGROUND OF THE INVENTION

1. Field of the Invention

The invention lies in the field of optical signal processing systems. More specifically, the invention relates to the address field recognition in an optical packet-switched network.

2. The Prior Art

In an optical packet-switched network, data, often in digital form, are transported through the network in optical packets. An optical packet is an optical signal, modulated with data, of a certain frequency and having a certain defined structure. It is customary that such a packet, such as, for example, an ATM cell, comprises a header section and a data portion, hereinafter referred to as address field ("header") and information field ("payload") respectively. The address field comprises, among others, coded routing and/or destination information, while the information field contains the actual data which are to be transported through the network. Once the packet arrives in a node of the network, that packet must, on the basis of the information in the address field of the packet, be switched through to either a receiver connected to the node or to a following node. The address field of the packet must thereto be read and possibly altered for transport to a following node, while the information field remains (or can remain) unread and unaltered. In principle, the optical packets from the optical domain can, for that purpose, first be converted to the electrical domain; in the electrical domain, after analysis and possibly modification of the address field, the packets can then be switched; and subsequently, the switched packets can again be converted to the optical domain. In light of the desire for ever higher bit speeds, however, this switching procedure is much too slow. Another possibility is to leave the optical packets in the optical domain as much as possible, and to switch optically. The optical switching means which need to be applied thereto, however, require an electrical driver. For that reason, a relatively small portion (for example, 10%) of the optical power which the optical packet contains is split off in order to derive therefrom, after analysis in the optical or electrical domain of the address and routing information in the address field, electrical control signals for driving the optical switching means. If necessary, the optical packet (that is, the remaining portion of the signal power, which contains the full packet information) is meanwhile, via temporary storage means such as, for example, a delay line, conducted to an input of the switching means.

A technique in which the address filed analysis is carried out in the electrical domain in known, for example, from reference [1] (for further bibliographical data relating to the references quoted, see hereinafter under section C). In this case, the split-off portion of the packet signal containing the full packet information is completely converted into an electrical signal. Since the length of the address field signal is in general much shorter than the information field signal (for an ATM cell, for example, the length ratio of the address field and information field signal is approx. 1:10), in fact an unnecessarily long time occurs before the actual analysis can start.

From reference [2], a technique is known in which, of the split-off portion of the optical signal of an ATM cell, with the aid of a synchronization signal obtained simultaneously from the split-off portion, only the first 5 bytes (the address field) are converted into an electrical signal, i.e., an "electrical address field". From analysis of the electrical address field signal, a driver signal is derived for the switching means. The analysis also results in a new address field signal which is converted into an optical signal. Via a beam coupler, the new address field signal is coupled synchronously to the other portion of the ATM cell signal, in order to replace the old address field signal therein.

From reference [3], a network is known in which from the split-off portion of the optical packet signal, in the optical domain, the address field signal is separated. This reference describes, an optical telecommunication system in which transmitted packets are composed of an optical data signal of a first wavelength, modulated with the data to be transmitted, and an optical control signal of a second wavelength. The second wavelength is specific for a certain destination, and therefore in fact forms the address field signal of the packet. A network node of the system is provided with an optical switch and with control means which selectively react to signals of the second wavelength for the routing of a related packet by the switch. In that case, a portion of the signal power of a packet is split off and examined by filtering in regard to a signal of the second wavelength which is specific for the node. When the node-specific signal is detected, the signal is converted into the electrical domain and applied as control signal for the switch. The system known from reference [3] has a number of limitations. As a result of the application of signals of various wavelengths within one packet, extra measures are required to counteract dispersion problems. The wavelength range from which the node-specific wavelengths are chosen is no longer available for a possible extension of the transmission capacity of the network. No possibility is indicated of giving the packet another destination while it is under way.

Besides the limitations previously noted above, the known techniques discussed above further have the disadvantage that, due to the splitting off of the signal for the purpose of analyzing the address field of the packet, a portion of the packet signal power is lost. In the technique of reference [2], such a loss of signal also occurs in the beam coupler to which the new address field signal is synchronously coupled for the purpose of replacing the old address field in the packet signal. Such signal losses demand additional signal amplification, especially if packets are to be routed via various nodes.

From references [12] and [13], an inter-connection technique for a multiple stage optical switching network is known in which transmission of data and address information takes place by means of optical signals which propagate in free space, and which are mutually orthogonally polarised. For switching purposes an address signal, at any rate a portion of the power of an address signal, is separated from the corresponding data signal in a so-called partial polarization beam splitter (PPBS). This address signal is compared, in the electrical domain, with a reference address signal, which can be an address signal of another data signal. Based on the result of the comparison, the related data signal, with the thereto preceding address signal (with reduced power), is switched through. As a great advantage of the application of mutually orthogonal polarization states for the address signal and the data signal, these references mention that these signals can be separated in a straightforward manner by application of passive optical devices. However, a restriction of this technique is that a good optical separation on the basis of polarization requires that the polarisation beam splitters continually have the proper orientation with respect to the polarisations of the signals to be separated. In inter-connection applications this is not a problem, since the distances to be bridged are often in the order of centimeters. In optical packet-switched networks, such as those applied for telecommunication purposes, and in which optical signal transmission takes place over distances which are more likely in the order of kilometers, and via transmission lines such as glass fiber connections which are usually not polarization-maintaining, this technique can not be utilized without further measures.

SUMMARY OF THE INVENTION

The object of the invention is to provide an optical packet-switched network which does not have the the limitations and disadvantages of the prior art. In particular, the object of the invention is to make the application of polarisation as physical quantity, known from references [12] and [13], on the basis of which the address field signal can be separated from the packet signal in the optical domain, suitable for transmission over optical line connections also, for example such as in packet-switched telecommunication networks. The invention therein applies optical packets, which are optical signals, of which the signal portions forming the address field and the information field are signals of the same wavelength and with different polarizations. In this regard, the invention makes use of the fact that, although the polarization itself is not maintained in the optical fibers which are common for standard optical connections, the angular relationship, which two different polarisation states in a Poincaré representation possess as points on the sphere of Poincaré, is maintained. Moreover, the invention makes use of the fact that in common optical switches this angular relationship is also retained and that, in principle, no signal power is lost in polarization splitters, combiners and controllers.

In the further description of the invention, the optical signal portions forming the address field and the information field of an optical packet signal will be referred to as the address signal and the data signal respectively; and an optical packet signal, of which the address signal and the data signal are polarized according to mutually different polarization states, are referred to as polarized packet signals.

An optical packet-switched network comprising first and second nodes connected by an optical connection, in which network the first node is provided with transmission means for generating and transmitting optical packet signals over the optical connection, in which each packet signal includes an address signal and a data signal, which are polarized according to mutually different polarization states, the packet signal hereinafter being referred to as polarized packet, and the second node is provided with switching means for the switching through of polarized packets, with polarization separating means for separating the address signal from at least a portion of the signal power of each polarized packet, and with control means for deriving from each separated address signal a control signal for controlling the routing of the polarized packet corresponding to the related address signal through the switching means, and for the definition of which network the technique known from references [12] and [13] is used, is according to the invention chracterized in that the address signal and the data signal of each polarized packet signal are signals which substantially have the same wavelength; in that the optical connection is a transmission line, and in that the second node is further provided with polarization control means which are included between the transmission line and the polarization separating means, for relatively controlling the polarization orientation of incoming packet signals with respect to the polarization separating means. A transmission line is taken to mean all optical conducting connections, not being free space, which are suitable for optical signal transmission, such as, for example, an optical fiber connection. Using the polarization control means, it can be ensured that incoming polarized packet signals are always optimally oriented with respect to the polarization separation means. Since the address signal and the data signal have the same wavelength, a dispersion problem, which can occur in the case of the technique known from reference [3], cannot occur.

Further preferred embodiments of the network according to the invention are summarized in sub-claims.

The invention also provides an optical packet switch and a transmission device for the switching and transmission, respectively, of polarized packet signals, and a device for receiving the address signal in an optical packet signal, for application in a network according to the invention. These devices have the advantage of being able to be implemented with well-integrable components.

An advantage of the application of the polarization as distinguishing physical entity of the address signal and the data signal in an optical packet signal can further be that the position of the address signal is no longer critical within the packet structure. Due to this, the packet structure is not necessarily bound to a structure in which the address field comes first, and the length of an optical packet can be restricted. This does require, however, that each receiver which is connected to the network is equipped with a polarization beam splitter and separate detectors for both polarizations in order to be able to receive the full packet information. On the other hand, both the transmission device and the address replacement device can work in a less time-critical fashion, making said devices simpler and cheaper.

From references [4] and [5], techniques are known in which address recognition takes place in the optical domain. In that regard, a synchronously generated bit pattern is locally (that is, in a node which receives a packet) compared with the address information in the address field of the portion of the optical packet signal obtained by power splitting. On detection of the bit pattern, an electrical control signal is generated for controlling an optical switch, to the input of which, via a delay line, the optical packet is conducted. On the transmission of an optical packet, a pulse-shaped clock signal, which is orthogonally polarized with respect to the optical packet signal, is added immediately preceding the address field for the purpose of the synchronous generation of the bit pattern. The clock signal is separated from the packet signal locally by polarization splitting of the split-off portion.

Reference [6] describes a technique in which a packet structure is applied, where a so-called "CW period" is added between an address field signal and an information field signal. This CW period is a constant signal with a length which is adapted to the address field. After analysis in the electrical domain of the address field signal in the portion of an incoming packet signal obtained by power splitting, the "CW period" of the delayed other portion of the packet signal is used to modulate a new address field therein.

References

[1] F. Masetti, et al., "ATMOS (ATM Optical Switching): Results and conclusions of the RACE R2039 project", ECOC '95, September 1995, Brussels, conference paper no. 243 (8 pages).

[2] F. Masetti and J. M. Gabriagues, "Optical cell processor for ATM gigabit photonic switches", ECOC '92, pp. 1–4.
[3] WO-A-9321706.
[4] I. Glesk, et al., "All-optical address recognition and self-routing in a 250 Gbit/s packet-switched network", Electronic Letters, Aug. 4, 1994, Vol. 30, No. 16, pp. 1322/3.
[5] D. Cotter, et al., "Self-routing of 100 Gbit/s packets using 6 bits 'keyword' recognition", Electronic Letters. Dec. 7, 1995, vol. 31, No. 25, pp. 2201/2.
[6] J. Spring et al., "Photonic header replacement for packet switching", Electronic Letters, Aug. 19, 1993, Vol. 29, No. 17, pp. 1523–1525.
[7] EP-A-0513919.
[8] WO-A-93/17363.
[9] EP-A-0562695.
[10] EP-A-0522625.
[11] EP-A-0738907 (by applicant; not published in time).
[12] R. B. Jenkins & B. D. Clymer, "Acousto-optic comparison switch for optical switching networks with analog addressing techniques", Applied Optics, Sep. 10, 1992, Vol. 31, No. 26, pp. 5453–5463.
[13] D. C. Butzer et al., "Highly efficient interconnection for use with a multistage optical switching network with orthogonaly polarized data and address information", Applied Optics, Apr. 10, 1995, Vol. 34, No. 11, pp. 1788–1800.

All references are deemed to be incorporated by reference into the present application.

SHORT DESCRIPTION OF THE DIAGRAM

The invention will be further described by means of description of an exemplary embodiment, in which will be referred to a diagram comprising the following figures.

DESCRIPTION OF EXEMPLARY EMBODIMENTS

Figure 1:
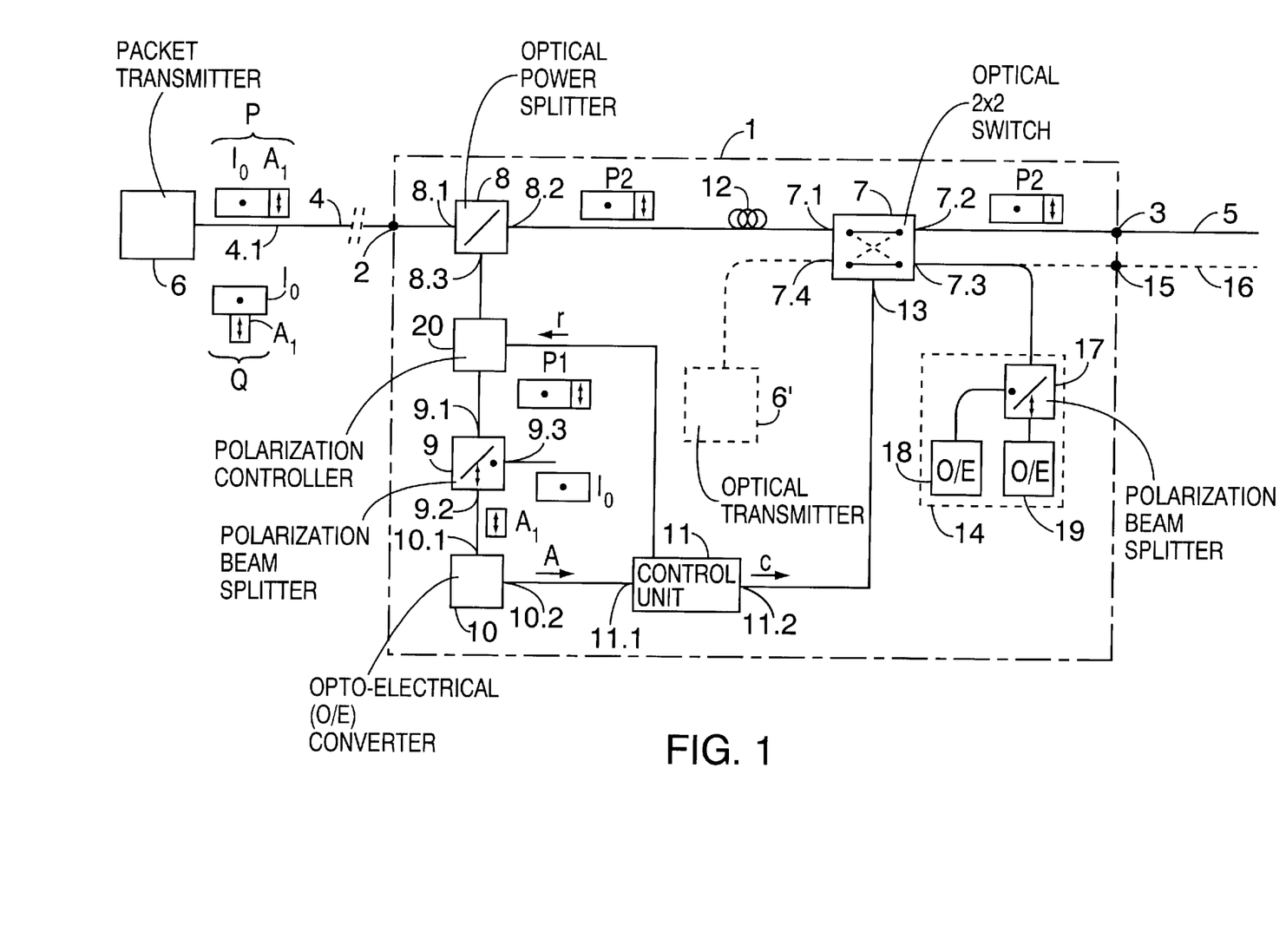
FIG. 1 diagrammatically shows an optical packet-switched system according to the invention, provided with a network node according to the first variant.

FIG. 1 shows a first variant for a node 1 of an optical packet-switched network comprising a number of such nodes which are mutually connected via optical fiber connections. The node 1 has an input port 2 and an output port 3 which are respectively coupled to fiber connections 4 and 5 of the network. At the extremity 4.1 of the fiber connection 4, a packet transmitter 6 is connected to the network. The packet transmitter 6 can form part of the main node (not shown) of the network, or of a similar node as the node 1 (see hereinafter). The packet transmitter 6 generates optical packet signals P, and transmits said signals over the fibre connection 4 in the direction of the node 1. Each packet signal P is an optical signal with a two-fold structure: an address signal $A_1$ and a data signal $I_0$. The data signals are signals modulated with information, in which the address signal contains information for routing the packet through the network to a desired destination, while the data signal contains information which is to be transported through the network to the destination. In the packet signal, the address signal and the data signal are optical signals having the same wavelength but different polarizations which are preferably mutually orthogonal. Such a packet signal is hereinafter referred to as a polarized packet signal. This is designated by the indices 1 and 0 in the designations $A_1$ and $I_0$ for the address signal and the data signal respectively; and further by the characters and • in the rectangles which in the figure correspond with the address signal $A_1$ and the data signal $I_0$ respectively, which together form a packet signal P. The node 1 comprises an optical 2×2 switch 7, an optical power splitter 8, a polarization beam splitter 9, an opto-electrical (O/E) converter 10, and a control unit 11. The power splitter 8 is provided with an input port 8.1 which is coupled to the input 2 of the node 1, with a first output port 8.2 which is, possibly over a delay line 12, coupled to a first input port 7.1 of the switch 7, and with a second output port 8.3 which is coupled to an input port 9.1 of the polarization beam splitter 9. An output port 9.2 of the polarization beam splitter 9 is coupled to an input port 10.1 of the opto-electrical signal converter 10. An input 11.1 of the control unit 11 is electrically connected with an output port of the signal converter 10, while an output 11.2 of said unit is electrically connected with a control signal input 13 of the switch 7. A first output port 7.2 of the switch 7 is coupled to the output 3 of the node 1. A second output port 7.3 is coupled, depending on the function of the node, either to an optical receiver 14 or to a further output 15 of the node 1, to which a further optical fiber connection 16 of the network is connected. An optical transmitter 6', of the same kind as the optical transmitter 6, can be connected to a second input port 7.4 of the optical switch 7.

Via the optical fiber connection 4, a polarized packet signal P transmitted by the transmitter 6 arrives at the input 2 of the node 1. In the power splitter 8, the polarized packet signal is split according to power (for example in the ratio of 1:9) into two polarized packet signals $P_1$ and $P_2$ which are identical in signal shape and differ only in intensity from the polarized packet signal P. Via the output port 8.3, the polarized packet signal $P_1$ is coupled through to the input port 9.1 of the polarization beam splitter 9. The polarization beam splitter 9 is oriented such that the polarized packet signal $P_1$ is split into a separate address signal $A_1$, which is conducted, via the output port 9.2, to the input port 10.1 of the O/E converter 10, and a separate data signal $I_0$, which appears at the output port 9.3. The separate data signal $I_0$ is not further used in this embodiment variant. In the O/E converter, the separate address signal $A_1$ is converted into an electrical address signal A. From the electrical address signal, a control signal c is derived by the control unit 11, this signal being placed on the control signal input 13 of the optical switch 7. The derivation of such a control signal is known per se and is therefore not further elaborated here. The other polarized packet signal $P_2$, which exits at the first output port 8.2 of the power splitter 8, is conducted via the delay line 12 to the first input port 7.1 of the switch 7. The transit time delay in the delay line 12 is such that the control signal c can be brought into the correct switching state in time to route the polarized packet $P_2$ through the switch. Dependent upon the control signal c, the packet signal is conducted either via the first output port 7.2 to the fiber connection 5 which is connected to output 3 of the node 1, or via the second output port 7.3 to the thereto connected optical receiver 14.

Figure 6:
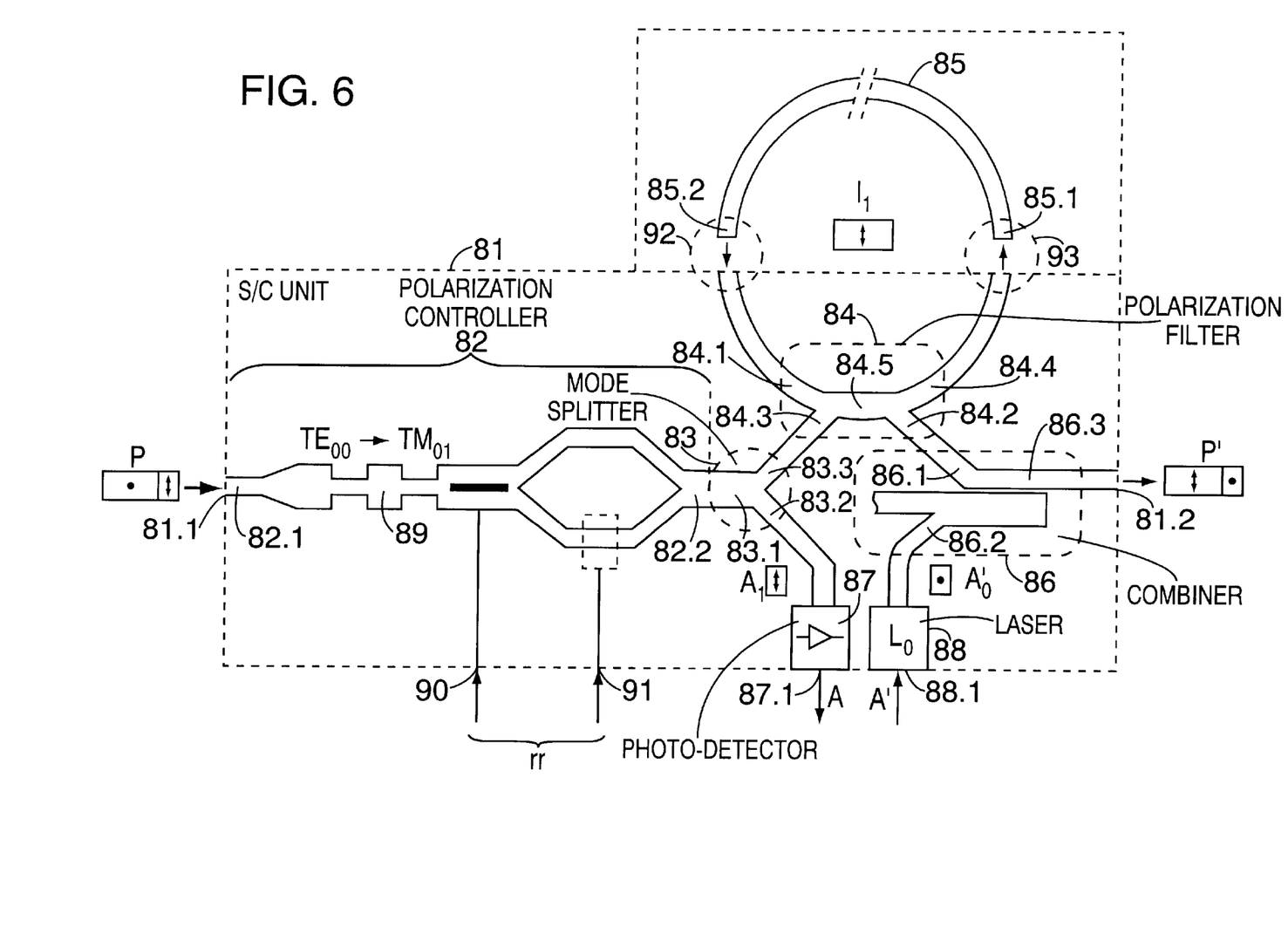
FIG. 6 diagrammatically shows a device for separating and combining an address signal and a data signal of an optical packet signal according to the invention.

In the above, it is shown that the polarization beam splitter is so oriented with respect to a received packet signal that the polarization splitting of the address signal and the data signal is carried out in an optimal manner. However, this can only be carried out readily if the packet signal is transmitted via a transmission path which retains polarization, for example if the fiber connection 4, and further up to the input port of the polarization beam splitter, is formed by polarization-retaining fiber. Such fibers are expensive, however, so that fiber connections are usually not polarization retentive. Moreover, due to variable ambient conditions such as temperature and mechanical stress, optical signals transmitted over a fiber connection in a fixed polarization state do not always arrive in a like polarization state. In this regard, relatively slow variations occur. The angular relationship (considered on Poincaré's sphere) between two different polarization states, with which optical signals are simultaneously or successively transmitted over such fiber connections, is indeed retained however. A polarization controller 20 must therefore be included in the signal path between the second output port 8.3 of the power splitter 8 and the input port 9.1 of the polarization beam splitter 9 to continuously adjust an incoming polarized packet signal to the usually fixed orientation of the polarization beam splitter 9. Such a polarization controller 20 is controlled by the control unit 11 by means of a control signal r which is derived, for example, from the average intensity of the electrical signal received at the input 11.1. Polarization controllers are known per se. An integrated embodiment of a polarization controller, which is known from reference [9], is applied in the device which is shown in FIG. 6 and is explained below.

If the packet structure of the polarized packet signal is such that the address signal with respect to time sequence directly precedes the data signal, a same optical receiver can be applied for the reception of such a packet as for non-polarized packet signals.

A polarized packet signal can be generated such that the address signal, considered in time sequence, lies completely or in part within the data signal, or even forms the tail of the packet. In FIG. 1 such a packet signal Q, in which the address signal $A_1$ lies completely within the data signal $I_0$, is diagrammatically shown. Of such a polarized packet signal Q, the address signal $A_1$ can also be simple separated from the data signal in the node 1. For a correct routing by the optical switch 7, the delay period of the delay line shall admittedly have to be somewhat adjusted for such a type of packet signal. The packet signal, however, will have passed the switch itself earlier, so that it can be available again slightly earlier for routing a subsequent signal packet. An optical receiver 14 for such a packet signal must now be provided with a polarization beam splitter 17 for separating the address signal and the data signal, and with two O/E converters 18 and 19 for the individual detection of the separate address and data signals.

Hereinafter, transmission devices (see FIG. 3 and FIG. 4) for both types of polarized packet signals will be described.

The node 1 as shown in FIG. 1 switches packet signals through in an unaltered fashion, specifically without adaptation. By way of example, a 2×2 switch has been chosen as an optical switch for switching the packet signals through in one of two directions.

Figure 2:
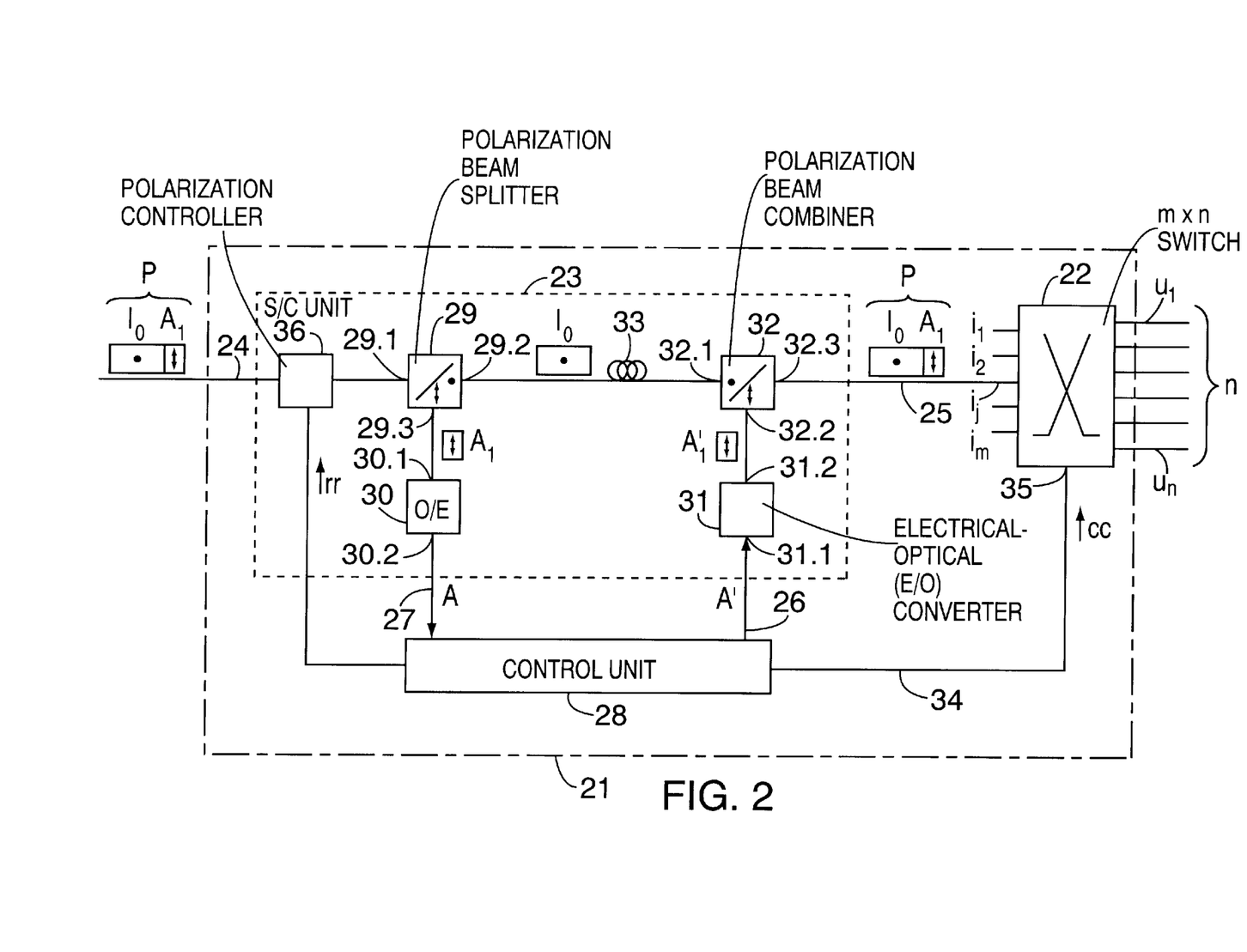
FIG. 2 diagrammatically shows a network node according to a second variant.

In FIG. 2, a variant is diagrammatically shown for a node 21 of a packet-switched network, in which packet signals can be switched through with possibly altered address signals in one of two or more different directions. The node 21 comprises an optical m×n switch 22 known per se, with m input ports $i_1, \ldots, i_m$ and n output ports $u_1, \ldots, u_n$. The n out put ports also form the n outputs of the node, where these n outputs are capable of being coupled to just as many fiber connections of the network. For each input port $i_j$, for j=1, ..., m, the node 21 comprises a unit 23 for separating address signals and data signals from incoming polarized packet signals, temporarily storing data signals, and combining address signals and data signals into outgoing polarised packet signals. Such a unit 23 is hereinafter designated as S/C unit 23 for the sake of brevity. Each S/C device has a packet signal input 24 and a packet signal output 25 for incoming and outgoing polarised packet signals respectively, and an electrical signal input 26 and signal output 27. Each packet signal input 24 also forms an input of the node 21, which is capable of being coupled to a fiber connection of the network. The packet signal output 25 of each unit 22 leads to separate input port $i_j$ of the optical switch 22. The node further comprises a control unit 28, which is coupled to the electrical signal input 26 and signal output 27 of each S/C unit 23. Each S/C unit comprises a polarisation beam splitter 29, an opto-electrical converter 30, hereinafter referred to as O/E converter, an electro-optical signal converter 31, hereinafter referred to as E/O converter, and a polarization beam combiner 32. An input port 29.1 of the polarization beam splitter 29 forms the packet signal input 24 of the S/C unit 23. With a first output port 29.2, the polarization beam splitter 29 is coupled over a delay line 33 to a first output port 32.1 of a polarization beam combiner 32, and is coupled with a second output port 29.3 to an input port 30.1 of the O/E converter 30. An output port 30.2 of the O/E converter 30 and an input port 31.1 of the E/O converter 31 form respectively the electrical signal output 27 and signal input 26 of the S/C unit 23. An output port 31.2 of the E/O converter 31 is coupled to a second input port 32.2 of the polarization beam combiner 32. An output port 32.3 forms the packet signal output 25 of the S/C unit 23. Via a signal line 34, the control unit 28 supplies an electrical control signal cc to the optical switch 22.

A polarized packet signal P entering the packet signal input 24 of the S/C unit 23 arrives at the input port 29.1 of the polarization beam splitter 29. The polarization beam splitter 29 is oriented such that the polarized packet signal P is split into a separate address signal $A_1$, which is conducted to the input port 30 of the O/E converter 30 via the output port 29.3, and a separate data signal $I_0$, which exits the output port 29.2 and is conducted to the first input port 32.1 of the polarization beam combiner 32 via the delay line 33. In the O/E converter 30, the separate address signal $A_1$ is converted into an electrical address signal A, which is conducted to the control unit 28 via the electrical signal output 27. From the electrical address signal A, the control unit 28 derives an altered electrical address signal A' and a control signal cc for the switch 22. The altered electrical address signal A' is placed on the electrical signal input 26 of the S/C unit, and the control signal cc is sent to the control signal input 35 of the switch 22. The derivation of such an altered electrical address signal and of such an electrical control signal, and the manner of control of the optical m×n switch is known per se, such as, for example, from reference [2], and is therefore not further elaborated. In the E/O converter, the altered electrical address signal A' is converted into optical (polarized) altered address signal $A_1'$, which is subsequently conducted to the second input port 32.2 of the polarization beam splitter combiner 32. Meanwhile, the separate data signal $I_0$ is conducted to the first input port 32.1 of the polarization beam combiner 32 via the delay line 33, which is preferably realized by means of a polarization maintaining, channel-shaped wave-guide. In the polarization beam combiner 32, the altered address signal $A_1'$ and the separate data signal $I_0$ are combined. The transit time delay in the delay line 33 is chosen such that at the output port 32.3 of the polarization beam combiner 32 a polarized packet signal P' exits which, via the packet signal output 25, is conducted to the related input $i_j$ of the switch. In the switch 22, the polarized packet signal P' is routed to one of the outputs $u_1, \ldots, u_n$ under control of the control signal cc derived by the control unit 28.

The node 21 too, and more specifically the S/C unit 23, can process packet signals Q in which the address signal is not necessarily a leading signal. Actually, only the delay line 33 in the S/C unit need be adapted to this end.

Generally the transmission path to which the packet signal input 24 is connected is not polarization-maintaining. So polarization regulation must also be applied in this second variant for a network node. To this end, a polarization controller 36 is included between the packet signal input 24 and the input port 29.1 of the polarization beam splitter 29, said controller being controlled by a control signal rr which is derived by the control unit 28 from the received electrical address signals A.

Figure 3:
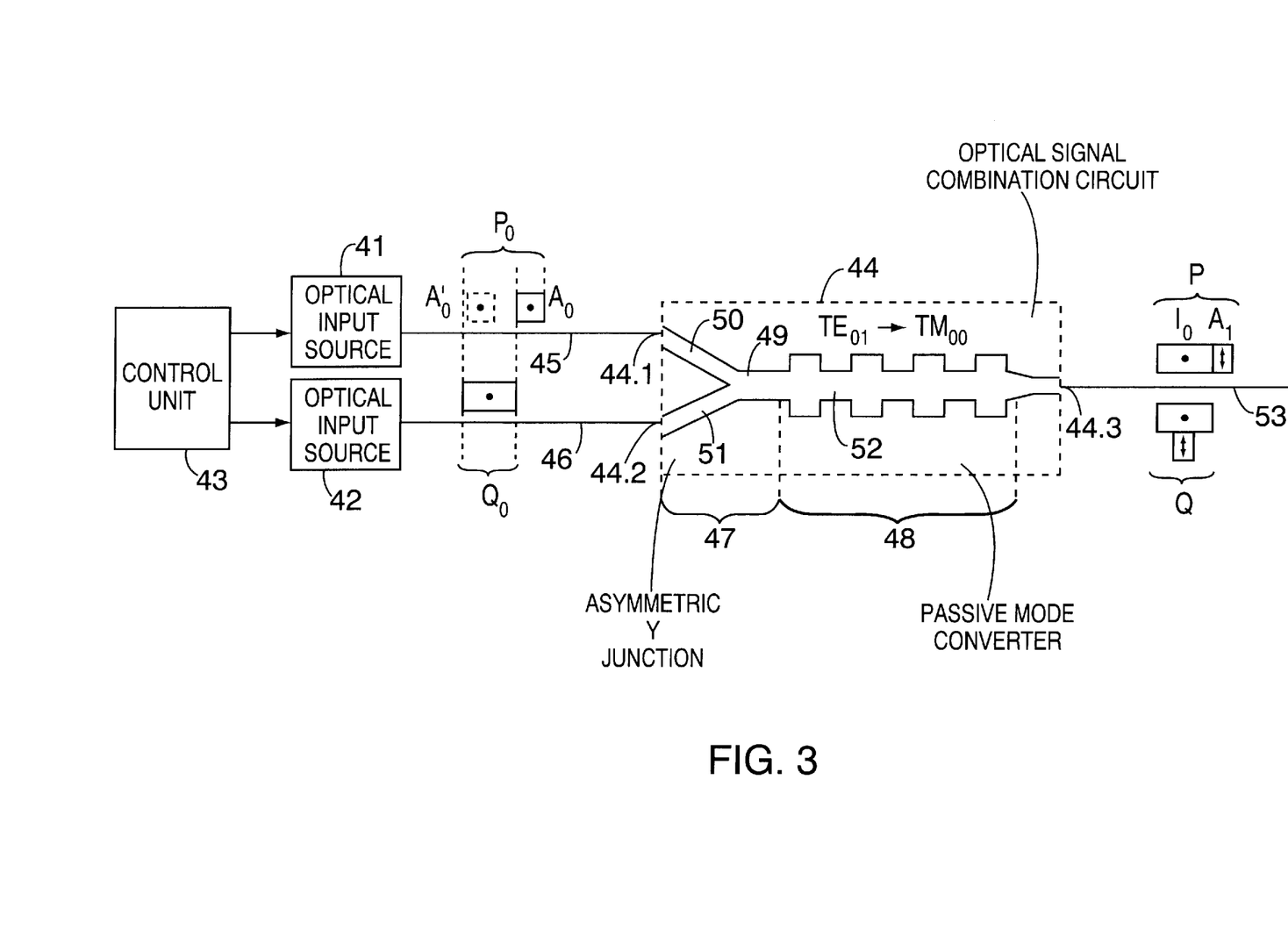
FIG. 3 diagrammatically shows an optical packet transmitter according to the invention in a first variant.
Figure 4:
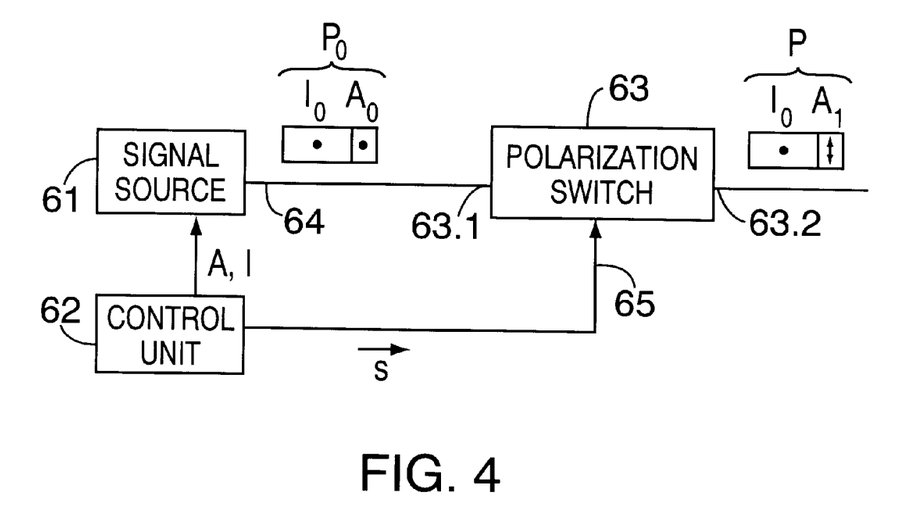
FIG. 4 diagrammatically shows an optical packet transmitter according to the invention in a second variant.

With reference to FIG. 3 and FIG. 4, two variants for a transmission device for polarized packet signals will be further described. The two variants apply components which are known per se, which are readily integrable, for example, on semiconductor material such as InP. FIG. 3 diagrammatically shows a first variant of such a transmission device. This device comprises two optical signal sources 41 and 42 which are capable of being modulated, a control unit 43 for the modulation of the signal sources, and an optical signal combination circuit 44. The circuit 44 has two input ports 44.1 and 44.2, and an output port 44.3. The output port 44.3 also forms the output of the transmission device. The signal sources 41 and 42 are optically coupled to the input ports 41 and 42 respectively of the circuit 44. The signal sources 41 and 42 are driven by the control unit 43 and transmit modulated optical signals of the same wavelength. For the transmission of a packet signal P, the signal source 41 is modulated with an electrical address signal A, and the signal source 42 with an electrical data signal I. DBR lasers or DFB lasers can be chosen as signal sources. In an integrated version of the transmission device, such lasers can be co-integrated, preferably in an identical form. In such a situation, said lasers transmit light signals with the same polarization which propagate themselves in adjoining channel-shaped wave-guides, for example as TE modes. Via mono-modal wave-guiding channels 45 and 46, the signal sources 41 and 42 are coupled to the input ports 44.1 and 44.2 respectively of the circuit 44. The transmitted signals therefore propagate therein as zero-order TE modes. The guided polarization modes TE and TM are designated below by a 0 and a 1 respectively as index in the designations of the address and data signals. Modulated with the respective electrical modulation signals A and I, the signal sources 41 and 42 respectively transmit the address signal $A_0$ over the channel 45 and the data signal $I_0$ over the channel 46. The circuit 44 is a combined polarization converter and combiner for guided polarization modes. This circuit is a polarization converter/splitter, applied in opposite propagation direction, which is known per se from reference [7]. The circuit comprises an asymmetric Y junction 47 and a passive mode converter 48. The Y junction has a bi-modal wave-guiding stem 49 and two mono-mode wave-guiding branches 50 and 51 having different propagation constants. In the figure, the larger width of the branch 51 with respect to that of branch 50 designates that branch 51, in the example of the two branches, has the largest propagation constant. The asymmetric Y junction functions such that a zero-order TE or TM mode which from branch 50 propagates further in the bi-modal stem converts to a first-order TE or TM mode, while such a mode which propagates further from the other branch 51 in the bi-modal stem 49 remains in the zero-order mode. The passive mode converter 48 is based on a central bi-modal channel-shaped wave-guide 52 which, on the one hand, connects to the bi-modal stem 49 of the asymmetric Y junction 47, and, on the other hand, is coupled to the output port 44.3 of the circuit 44. The central bi-modal wave-guide 52 of the mode converter 48 is provided with a periodic geometric structure which is dimensioned for a 100% $TE_{01}$ $TM_{00}$ conversion. Such a mode converter is selective for the pair of guided modes, in this case first-order TE mode and the zero-order TM mode, such that a zero-order TE mode is allowed to pass unaltered. So an address signal $A_0$ or $A_0'$ transmitted by the signal source 41 which propagates as zero-order TE mode via the mono-modal channel 45 in the "narrow" mono-modal branch 50, appears at the output port 44.3 as zero-order TM mode, that is, as address signal $A_1$ or $A_1'$. A data signal $I_0$ transmitted by the signal source 42 which enters the "wide" mono-modal branch 51 via the mono-modal channel 46, will exit unaltered in the zero-order TE mode at the output port 44.3 By suitable "timing" by the control unit 43 of the driver of the signal sources 41 and 42, the address and data signals ($A_0$ or $A_0'$, and $I_0$) can be transmitted at such moments in time that at the output port 44.3, over a thereto connected fiber connection 53, polarized packet signals P or Q are transmitted. By choosing the branch 50 "wide", and the branch 51 "narrow", precisely the data signal $I_0$ will be converted to the other polarization in the circuit 44, while the address signal $A_0$ is not converted, so that at the output polarized packet signals ($A_0$, $I_1$) appear. Such packet signals are completely equivalent packet signals ($A_1$, $I_0$).

The necessary polarization conversion can also be carried out in one of the mono-modal wave-guiding channels 45 and 46, for example with a passive mono-modal polarization converter (100% $TE_{00}TM_{00}$). In that case, the circuit 44 can be replaced by a simpler polarization splitter, for example such as described in reference [11].

It goes without saying that, for the signal sources 41 and 42, two lasers can also be applied which transmit mutually orthogonal polarized optical signals, one, for example, transmitting TE signals and the other TM signals. In that case, the circuit 44 can admittedly also be replaced by the said simpler polarization splitter. Co-integrating a pair of such lasers, even if implementable, makes the manufacturing of the transmission device considerably more complex however. In an embodiment with discrete components, such a mutual orientation of the transmission lasers to be applied can be realized in a simpler manner.

Figure 5:
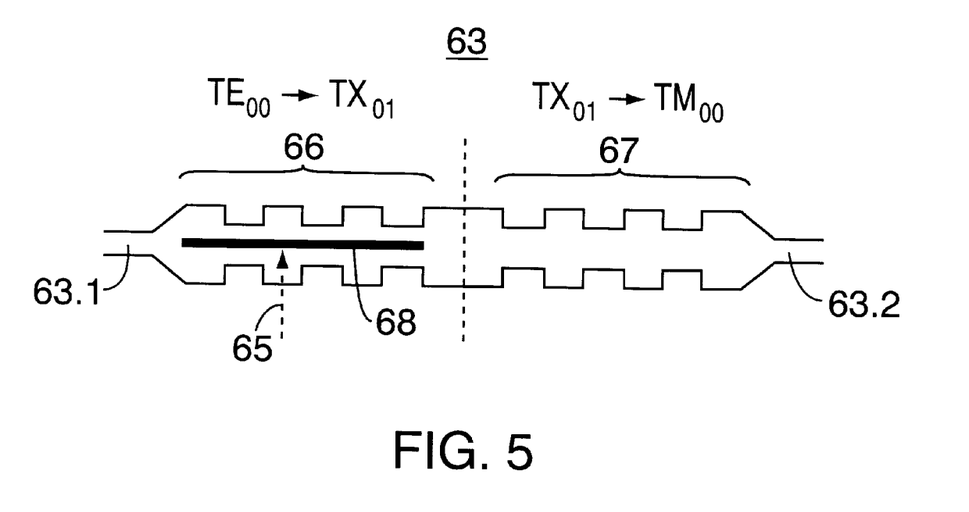
FIG. 5 diagrammatically shows a detail of the optical packet transmitter according to the second variant.

In FIG. 4, a second variant for a transmission device for polarised packet signals is diagrammatically shown. This variant comprises a signal source 61 capable of optical modulation, a control unit 62, and a polarization switch 63. The polarization switch 63 is provided with an optical signal input port 63.1 and an optical signal output port 63.2. The signal output port 63.2 also forms the output of the transmission device. The signal source 61 is coupled to the input port 63.1 of the polarization switch 63 via a mono-modal wave-guiding channel 64. The signal source 61 is of the same kind as the signal sources 41 and 42 of the first variant. They are driven by the control unit 62, both with the electrical address signal A and with the electrical data signal I which are now successively presented by the control unit 62. Driven in this manner the signal source 61 transmits a packet signal $P_0$ which propagates over the channel 64 in a zero-order TE mode, and in which the address signal and the data signal have the same polarisation. The polarization switch 63 is switchable by means of a switching signal s which is sent to the switch via an electrical signal line 65 by the control unit 62. The polarization switch 63 consists of a mode switch 66 and a passive mode converter 67, as diagrammatically shown in FIG. 5. The mode switch 66 is based on a 100% $TE_{00}TX_{01}$ converter, this converter being provided with electrode means 68 which can be driven via the signal line 65 for switching between two states: a first state S1 in which a zero-order TE mode entering via the input port 63.1 is converted into a first-order TX mode (TX is TE or TM), and a second state S2 in which the conversion does not occur. Such a mode switch is known from reference [8]. The passive mode converter 67 is a 100% $TX_{01}TM_{00}$ converter, of which the bi-modal central wave-guide connects directly to that of the mode switch 66. The mode switch is driven by the control unit in such a manner that, at the moment in time at which the packet signal $P_0$ with the address signal $A_0$, transmitted by signal source 61, enters the mode switch 66, this switch is in the first state S1, and the mode switch 66 is switched over to the second state S2 in the transition between the address signal $A_0$ and the data signal $I_0$. At the output port 63.2, the address signal exits as a zero-order TM mode, that is, as an address signal $A_1$, while the data signal $I_0$ following it exits unaltered, so that together they form a polarized packet signal P.

It goes without saying that, for the signal sources 41 and 42 in the first variant and the signal source 61 in the second variant of the transmission device, instead of lasers which are capable of being modulated, lasers with a constant optical signal which can be switched on/off can be chosen, which are connected in series with a signal modulator driven by the control unit with the suitable modulation signals (A, I).

In FIG. 6, an integrated-optical embodiment is diagrammatically shown of an S/C unit 81 for separating and combining an address signal and a data signal of a polarized packet signal, which corresponds to the S/C unit 23 of FIG. 2. The S/C unit 81 has a packet signal input 81.1 and a packet signal output 81.2. The S/C unit 81 comprises a polarization controller 82, a mode splitter 83, a polarization filter 84, a polarization-maintaining delay line 85, a polarization splitter used as combiner 86, a photodetector 87, and a laser 88 which is capable of being modulated. The polarization controller 82 has a mono-modal input channel 82.1, which forms the packet signal input of the S/C unit 81, and a bi-modal output channel 82.2. The polarization controller is of a kind as known from reference [9]. The polarization controller comprises a passive mode converter 89 for mode order number and polarization (in this case, 100% $TX_{00}$ $TY_{01}$ converter with TX is TE or TM, and TY is TM or TE). The polarization controller further has two control signal inputs, 90 and 91 respectively, for a phase control signal and an amplitude control signal (control signal rr from FIG. 4). With these control signals, the polarization controller is continuously controllable in such a manner that an optical signal, which enters via input channel 82.1 and is composed of two signal components with mutually orthogonal polarizations, appears in the output channel 82.2 as an optical signal in which the two signal components have the same polarization but differ in order number (that is, as $TY_{00}$ and $TY_{01}$ signal). The mode splitter 83 is an asymmetric Y junction with a bi-modal stem 83.1 which forms the continuation of the bi-modal output channel 82.2 of the polarization controller 82, a first mono-modal "wide" branch 83.2 which leads to the photodetector 87, and a mono-modal "narrow" branch 83.3. The polarization filter is of a kind known from reference [10]. This filter is a TY filter, adapted to the chosen passive mode converter. The filter consists of two asymmetric Y junctions, each with a "narrow" mono-modal branch, 84.1 and 84.2 respectively, and a "wide" mono-modal branch, 84.3 and 84.4 respectively, which are coupled back to back via a common wave-guiding stem 84.5 which is mono-modal for the one polarization (TX) and bi-modal for the other polarization (TY). The "wide" branches, 84.3 and 84.4, and the "narrow" branches, 84.1 and 84.2, lie in diagonal positions with respect to the common stem 84.5. The "narrow" branch 83.3 of the mode splitter 83 is coupled via an adiabatic adapter to the "wide" branch 84.3 of the polarization filter 84. The "wide" branch 84.4 is coupled to a first extremity 85.1 of the delay line 85, while the "narrow" branch 84.1 is coupled to the other extremity 85.2 of the delay line 85. The "narrow" branch 84.2 is coupled to a first mono-modal input channel 86.1 of the polarization splitter 86, which is applied as combiner, while the laser 88 is connected to a second mono-modal input channel 86.2. A mono-modal output channel 86.3 of the polarization splitter 86 forms the packet signal output of the S/C unit 81. The polarization splitter shown here diagrammatically is of a kind as described in reference [11].

In order to separate the address signal $A_1$ of a polarized packet signal P, which enters at the input 81.1 of the S/C unit 81, from the data signal $I_0$ and to be able to detect it via the photodetector 87, the polarization controller 82 must be adjusted such that, in the bi-modal output channel 82.2, the address signal is propagated as zero-order guided mode signal and the data signal as a first-order guided mode signal. In that case, the address signal $A_1$ is conducted to the photodetector 87 via the "wide" branch 83.2 of the mode splitter 83, and is placed on the electrical output port 87.1 as electrical address signal A (for example, for a control unit 28 in FIG. 2). The data signal, now as $I_1$ signal, propagates as zero-order TY mode via the "narrow" branch 83.1 of the mode splitter 83 and via the "wide" branches 84.3 and 84.4 of the polarization filter to the input 85.1 of the delay line 85. After passing through the delay line 85 the data signal $I_1$, still as zero-order TY mode, enters the polarization filter 84 via the "narrow" branch 84.1 and leaves the filter in the same guided mode via the "narrow" branch 84.2. The data signal $I_1$ subsequently propagates unaltered through the polarization splitter 86, via the input channel 86.1 and the output channel 86.3, to the packet signal output 81.2 of the S/C unit. The laser is modulated by an altered electrical address signal A' which is received at the electrical input port 88.1 of the laser 88 and sends an altered address signal $A_0$' to the input channel 86.2 of the polarization splitter. In the polarization splitter 86, the altered address signal $A_0$' is combined with the data signal $I_1$ into an outgoing polarized signal packet P' with an altered address signal.

In principle, the delay line 85 can be coupled, directly or via mutually crossing-wave-guides, with its extremities 85.1 and 85.2 to the "narrow" branch 83.3 of the mode splitter 83 and the input channel 86.1 of the polarization splitter 86. In integrated form, the mutually crossing wave-guides have the advantage of taking up less space. Such crossing wave-guides can be realized by channel-shaped wave-guides which intersect at a sufficiently large angle. A smaller embodiment is formed by two asymmetric Y junctions coupled by means of a common, bi-modal stem. Of that, the polarization filter 84 again is a special form, in the sense that the common stem is bi-modal for one of the polarizations only. Thereby, a signal is filtered in the signal passage via the "narrow" branches 84.1 and 84.2 as to polarization. This works correctively on the data signal $I_1$ in the case that the delay line 85 is not exactly polarization-maintaining.

The delay line 85 can be co-integrated, for example in the form of a spiralling loop. Since a signal propagating in TM mode in an integrated channel-shaped wave-guide experiences less damping, a $TE_{00}TM_{01}$ converter is preferably chosen for the passive mode converter 89 in the polarization controller 82.

A polarization-maintaining fiber, of which the extremities 85.1 and 85.2 are connected, via suitable connectors 92 and 93 respectively, to the "narrow" branch 84.1 and the "wide" branch 84.4 of the polarization filter 84, can also be applied as delay line 85. Such an embodiment has the advantage that, for a specific application of the S/C unit 81, the delay period of the delay line can be simply adapted by means of a fiber of suitable length.

What is claimed is:

1. An optical packet-switched network comprising:

first and second nodes connected by an optical connection, wherein the first node comprises transmission means for generating and transmitting optical packet signals over the optical connection, each packet signal comprising an address signal and a data signal wherein the address and data signals are polarized in each of said packet signals according to mutually different polarization states so as to collectively define polarized packets; and the second node comprises:

switching means for switching the polarized packets;

polarization separating means for separating the address signal from at least a portion of the optical packet signals containing the polarized packets so as to form separated address signals; and control means for deriving, in response to the separated address signals, a control signal for controlling routing, through the switching means, of a corresponding one of the polarized packets associated with each of the separated address signals; and wherein:

the address signal and the data signal of each of the polarized packets have substantially the same wavelength;

the optical connection is a transmission line, and the second node further comprises polarization control means, connected between the transmission line and the polarization separating means, for controlling polarization orientation of incoming packet signals applied to the second node and relative to the polarization separating means.

2. The optical network according to claim 1, wherein the second node further comprises an optical power splitter having an input port, coupled to the transmission line, and first and second output ports coupled to an input port of the switching means and to an input of the control means, respectively.

3. The optical network according to claim 1, wherein:

the control means comprise address modification means for generating, in response to an input address signal, a modified optical address signal having substantially the same wavelength as the input address signal;

the polarization control means has input and output ports, the input port of the polarization control means being coupled to the transmission line;

the polarization separating means comprise a polarization beam splitter having an input port coupled to the output port of the polarization control means, and first and second output ports, the second output port of the polarization separating means being coupled to an input of the control means; and the second node further comprises polarization beam combining means for combining the modified optical address signal and a data signal exiting at the first output port of the polarization beam splitter into a polarized packet, wherein the polarization beam combining means comprises a first input port, coupled to the first output port of the polarization beam splitter, a second input port, coupled to the address modification means, and an output port, coupled to an input port of the switching means.

4. A packet switch for switching optical packet signals, each of the signals having an address signal and a data signal polarized according to first and second mutually different polarization states, respectively, wherein the switch comprises:

optical switching means having at least one input and at least two outputs which can be coupled to incoming and outgoing optical transmission lines, respectively;

polarization separating means for separating address signals from incoming packet signals appearing on the incoming transmission lines so as to form separated address signals;

control means for deriving, from the separated address signals, control signals for controlling routing, through the optical switching means, of the incoming packet signals from the one input of the switching means to one of the outputs of the switching means, the one output being derived from one of the separated address signals; and for each different input of the switching means, the polarization separating means comprises a polarization beam splitter preceded by a polarization controller for controlling relative polarization orientation of an incoming packet signal with respect to the polarization beam splitter, a data signal and an address signal exiting respectively at first and second output ports of the polarization beam splitter.

5. The packet switch according to claim 4, wherein:

the control means comprises address modification means for generating, in response to the incoming packet signal, a modified optical address signal having substantially the same wavelength as the separated address signal; and for each different input of the packet switch, the packet switch further comprises polarization beam combining means for combining the modified optical address signal and the data signal, exiting at the first output port of the polarization beam splitter, into a polarized packet, wherein the polarization beam combining means has a first output port, coupled to the first input port of an associated polarization beam splitter, a second input port, coupled to the address modification means, and an output port coupled to an input of the optical switching means.

6. The packet switch according to claim 4 further comprising, for each input of the switching means, an optical power splitter having an input port coupled to a corresponding transmission line, a first output port, coupled to an associated input of the optical switching means, and a second output port coupled to an input port of the polarization controller.

7. A device for replacing an address signal in an optical packet signal, the packet signal having a packet structure which comprises an address signal and a data signal, the device comprising:

a packet signal input for an incoming packet signal;

a packet signal output for an outgoing packet signal;

signal separation means for separating an address signal from an incoming packet signal so as to form a separated address signal;

an address signal output for supplying the separated address signal;

an address signal input for receiving a further address signal;

signal combination means for combining at least a portion of the incoming packet signal with the further address signal into an outgoing packet signal; and wherein:

the signal separation means comprises a polarization beam splitter having an input port, coupled to the packet signal input, and first and second output ports, the second output port being coupled to the address signal output, and the signal combination means comprise a polarization beam combiner having a first input port, coupled to the first output port of the polarization beam splitter, a second input port, coupled to the address signal input, and an output port coupled to the packet signal output; and the incoming and outgoing packet signals are polarized packet signals in which the address signal and the data signal are signals which are polarized according to different polarization states.

8. The device according to claim 7, wherein the first input port of the polarization beam combiner and the first output port of the polarization beam splitter are coupled together via a polarization-maintaining waveguide.

9. The device according to claim 8, further comprising polarization control means connected between the packet signal input and the input port of the polarization beam splitter.

10. The device according to claim 9, wherein:

the polarization control means comprise:

a polarization controller, having a passive mode converter, for converting a zero-order guided mode of a first polarization state into a first-order guided mode of a second polarization state orthogonal to the first polarization state;

a mono-modal input channel; and a bi-modal output channel; and wherein the polarization beam splitter is a mode splitter having an asymmetric Y junction, with a bi-modal stem, coupled to the bi-modal output channel of the polarization controller.

11. The device according to claim 8 further comprising an optical delay coupled, via a waveguide crossing, to the polarization-maintaining waveguide.

12. The device according to claim 11 wherein the waveguide crossing comprises a polarization filter.

13. The device according to claim 7, wherein the address signal output is constituted by an electrical output of an opto-electrical (O/E) signal converter, the O/E converter having an optical input coupled to the second output port of the polarization beam splitter, and the address signal input is constituted by an electrical input of an electro-optical (E/O) signal converter, wherein an optical output of the E/O converter is coupled to the second input port of the polarization beam combiner.

14. The device according to claim 7, further comprising polarization control means connected between the packet signal input and the input port of the polarization beam splitter.

15. The device according to claim 14, wherein:

the polarization control means comprise:

a polarization controller, having a passive mode converter, for converting a zero-order guided mode of a first polarization state into a first-order guided mode of a second polarization state orthogonal to the first polarization state;

a mono-modal input channel; and a bi-modal output channel; and wherein the polarization beam splitter is a mode splitter having an asymmetric Y junction, with a bi-modal stem, coupled to the bi-modal output channel of the polarization controller.

16. The device according to claim 15 wherein the first input port of the polarization beam combiner and the first output port of the polarization beam splitter are coupled together via a polarization-maintaining waveguide, and the device further comprises an optical delay coupled, via a waveguide crossing, to the polarization-maintaining waveguide.

17. The device according to claim 15 wherein the address signal output is constituted by an electrical output of an opto-electrical (O/E) signal converter, the O/E converter having an optical input coupled to the second output port of the polarization beam splitter, and the address signal input is constituted by an electrical input of an electro-optical (E/O) signal converter, wherein an optical output of the E/O converter is coupled to the second input port of the polarization beam combiner.

18. The device according to claim 14 wherein the first input port of the polarization beam combiner and the first output port of the polarization beam splitter are coupled together via a polarization-maintaining waveguide, and wherein the device further comprises an optical delay coupled, via a waveguide crossing, to the polarization-maintaining waveguide.

19. A transmission device for generating optical packet signals having a packet structure comprising an address signal and a data signal, the address and data signals being polarized according to first and second mutually different polarization states, respectively, the device comprising:

control means;

an optical signal generator, responsive to the control means, for transmitting, via an outgoing optical waveguide, a packet signal modulated according to the packet structure; and polarization setting means, switchable by the control means and situated in the outgoing optical waveguide, for setting, under the control of the control means, the polarization of the address signal according to the first polarization state, and of the data signal according to the second polarization state differing from the first polarization state, for each packet signal which is transmitted via the outgoing waveguide.

20. The transmission device according to claim 19, wherein:

the outgoing waveguide is a mono-modal waveguiding channel in which a packet signal, according to a zero-order mode of the first polarization state of two mutually orthogonal polarization states (TE, TM), propagates; and the polarization setting means comprise a switchable polarization converter and a passive polarization converter connected in series, the switchable polarization converter being switchable between a first switching state, in which a zero-order mode of the first polarization state (TE or TM) is converted into a first-order mode of the second polarization state (TM or TE), and a second switching state in which no polarization conversion takes place, and the passive polarization converter converts a first-order mode of the second polarization state (TM or TE) into a zero-order mode of the second polarization state.

* * * * *